Nov. 20, 1962  R. W. BROWN ETAL  3,064,705
VALVE STEM LOCK
Filed May 18, 1956
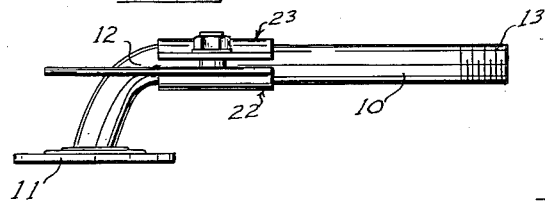
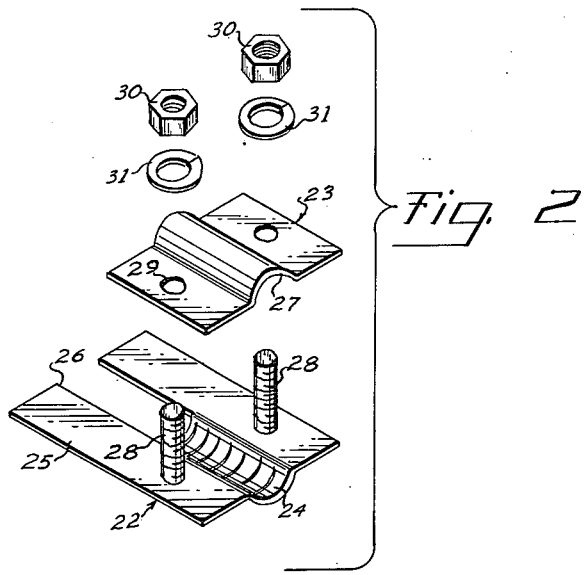
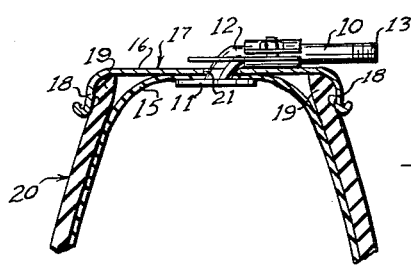
INVENTORS
RAYMOND W. BROWN
MORRIS M. LANE
BY
ATTORNEY

3,064,705
VALVE STEM LOCK

Raymond W. Brown, 123 Pine St., College Park, Ga., and Morris M. Lane, 2605 Ivydale Drive SW., Atlanta, Ga.

Filed May 18, 1956, Ser. No. 585,836
3 Claims. (Cl. 152—427)

This invention relates to a pneumatic tire inner tube valve stem lock, and is particularly concerned with a clamp for precluding the inadvertent displacement of a valve stem inwardly through a vehicle tire rim in the event of deflation.

When the sudden and substantially complete deflation of the inner tube of a vehicle tire as occurs in a blowout is accompanied by continued tire rotation, the valve stem, which normally protrudes through the valve stem aperture of the tire rim, is frequently drawn inwardly through the rim aperture creating difficult problems. Should rotation continue, particularly at high speeds, the centrifugal forces urge the deflated tube outwardly whereby the metallic and non-uniform character of the valve stem results in injury both to the tube and the interior surface of the tire to the end that further usefulness may be fully destroyed. This danger is particularly flagrant in the use of multiple tires on trucks, trailers or the like wherein the deflation of the tube of one of a pair or one of a triple group of tires will not destroy the support provided by the companion fully inflated tires and thus the operator is not immediately acquainted with such deflation and the vehicle may travel considerable distances at considerable peripheral speed of the tires before the deflation becomes noticed. In such case such continued rotation of the deflated tube will draw the valve inwardly of the tire casing and provide highly destructive wear, abrasion and incisions both with respect to the tube and to the tire casing within which the tube is mounted.

It is therefore among the primary objects of the present invention to provide a novel and improved valve stem clamp adapted to be exteriorly applied to the stem to preclude the inward withdrawal thereof in the event of inner tube deflation.

Another object of the present invention is to provide a clamp for the valve stem of an inner tube which may be simply and easily applied exteriorly of the tire rim to preclude withdrawal of the stem through the rim in the event of deflation and continued rotation of the tire. It is also an object of the present invention to provide a clamp of the character set forth which is simple in construction, readily applied and removed and which is rugged and durable as well as meeting the demands of economic manufacture.

A further object of the invention is to provide a clamp of the character set forth which may be applied and removed without the requirement of special tools or skill and which may be utilized without any modification or change in the conventional inner tube valve stem or rim with which it is to be associated.

Numerous other objects, features and advantages of the present invention will be apparent from consideration of the following specification taken in conjunction with the accompanying drawings in which:

FIG. 1 is a side elevation of a conventional inner tube valve stem with the present invention applied thereto.

FIG. 2 is an exploded view of the parts of the present invention.

FIG. 3 is a sectional view through a tire and tube assembly showing the valve stem secured by the application thereto of the present invention.

While the structure of the present invention may be variously modified in order to meet the requirements of particular installations, that form of the invention here shown by way of illustration may be generally defined as including a body element and a cooperating clamp element, both of which are centrally formed in the configuration of one-half of the valve stem whereby the parts cooperatively define a passageway through which the valve stem may pass and between which the valve stem may be engaged and securely clamped. The body includes threaded securing members here shown as integral studs while the companion element is apertured to receive therethrough the securing means over which nuts and suitable spring washers may be applied to provide for clamping of the stem between such elements with a resilient force. An important feature of the invention is the provision of a bifurcated structure for the body by which extending wings are formed between which the angular bent portion of the valve stem is received and which extends rearwardly beyond the stem to provide a flat external bearing surface which may engage the inner peripheral face of the tire rim on three sides about the stem aperture to preclude the withdrawal of the stem through the aperture.

Referring now more particularly to the drawings, it will be seen that the numeral 10 indicates generally a conventional inner tube valve stem here shown as of the angularly bent, rigid metallic type commonly found used in connection with the inner tubes of truck and trailer tires. As in conventional practice the inner end of the stem 10 is provided with an annular flange 11 to which the inner tube is secured as by a vulcanized bond or the like. Outwardly from the flange 11 the stem is turned at an angle indicated at 12 and terminates at an externally threaded portion 13 which is adapted to receive the usual cap (not shown) and within which the conventional inflation and deflation valve is located.

As more clearly shown in FIG. 3, the tube 15 is mounted with its flange 11 normally bearing against the outer face 16 of the conventional rim 17. The internal peripheral face of the rim has disposed thereover the stem 10 protruding through its valve stem aperture 21. The side flanges 18 of the rim receive and clinch the peripheral beads 19 of the tire 20. It will of course be recognized that upon deflation of the tube 15 the tube tends to collapse and draw inwardly the stem 10 through the aperture 21 of the rim 17. In the event of such deflation should the tire continue normal speeds centrifugal forces will collapse the tube outwardly toward the outer face of the tire, further inducing withdrawal of the stem through the aperture 21. With the rough metallic stem loose within the casing such rotation will cut and abrade both tube and tire frequently destroying further usefulness of both.

To preclude such inadvertent withdrawal of the stem through the aperture 21, the present invention provides body and clamp elements as best shown in FIG. 2 and indicated by the numerals 22 and 23 respectively, the body 22 preferably disposed as the inner clamp element is provided with a central depression 24 adapted to conform with the lower curved surface of the stem 10 and is further provided with outwardly projecting wings 25 which extend rearwardly from the depression 24. Between the wings 25 the element 22 is cut away as at 26 to form a furcated structure adapted to receive therein the bent portion 12 of the stem 10.

The assembly further includes an upper companion clamped element 23 which has a central depression 27 conforming to the upper surface of the valve stem beyond the bend 12 whereby the depressions 24 and 27 jointly form a tubular passage for the outer straight end of the stem 10. One of the elements, preferably the lower element 22 is formed with integrally secured threaded studs 28 which are adapted to be received through apertures 29 of the upper companion clamp element 23.

For securing the elements in clamped and protective position about the valve stem 10 nuts 30 and, if desired, intermediate spring washers 31 are provided, the arrangement being such that with the body element 22 placed about the valve stem with its wings 25 extending rearwardly across the inner face of the rim and the bend 12 of the stem being received within the furcated portion of the element, the opposed element may be placed on the upper side of the stem with the studs 28 located through the apertures 30 and with the spring washers 21 encircling the studs on the outer face of the element 23 and with the nuts 30 securing the elements together about the stem with the application of spring tension.

It will be seen from the foregoing structure that the clamp of the present invention may be applied and removed without special tools or skill and without any modification of the normal configuration of the tire rim 17. In the event of deflation of the tube 15 when the clamp is applied to the stem 10 it will be seen that the under flat surface of the element 22 including the under flat surfaces of the wings 25 will bear against the outer face of the rim 17 and preclude any withdrawal of the stem into the confines of the tire 20. An important feature of the present invention is that the clamp may be universally applied to a wide variety of valve stems and that in its application it will in no way disturb the conventional location and operation of the valve stem. In the practice of the invention it will be understood that numerous changes, modifications and the full use of equivalents may be resorted to without departing from the spirit or scope of the same as outlined in the appended claims.

We claim:

1. The combination with a tire, inner tube and rim assembly including an angular valve stem secured to said inner tube and having a short portion extending in a radial direction from the inner tube through an aperture in the central portion of the rim and a continuing angularly related laterally extending portion, of a valve stem lock to preclude movement of said valve stem through said rim aperture into said tire upon deflation of the tire, said lock including a body, means spaced from one end of said body engaging the laterally extending portion of said stem at a point spaced from said radially extending portion of the stem, said body extending from its engagement with the lateral extending portion of the stem inwardly toward the radially extending portion of the stem in a plane generally parallel to an inner face of the rim at the aperture thereof, the inner terminal end of said body being bifurcated and extending past said radially extending portion of the stem with the furcations thereof laterally straddling said radially extending portion, said body being so secured to the laterally extending portion of the stem as to move with the stem to engage the inner face of the rim adjacent said radially extending portion of the stem upon tendency toward inward movement of the stem upon deflation of the tire.

2. The combination with a tire, inner tube and rim assembly including an angular valve stem secured to said inner tube having a short portion extending in a radial direction from the inner tube through an aperture in the central portion of the rim and a continuing angularly related laterally extending portion of a valve stem lock to preclude movement of said valve stem through said rim aperture into said tire upon deflation of the tire, said lock including a body, means spaced from one end of said body receiving the laterally extending portion of said stem therethrough and engaging said laterally extending portion of the stem, said body extending from its engagement with the laterally extending portion of the stem inwardly toward the radially extending portion of the stem in a plane generally parallel to an inner face of the rim at the aperture thereof, the inner terminal end of said body being bifurcated and extending past said radially extending portion of the stem, with the furcations thereof laterally straddling said radially extending portion of the stem, said body being so secured to the laterally extending portion of the stem as to move with the stem to engage the inner face of the rim adjacent said radially extending portion of the stem upon tendency toward inward movement of the stem upon deflation of the tire.

3. The combination with a tire, inner tube and rim assembly including an angular valve stem secured to said inner tube having a short portion extending in a radial direction from the inner tube through an aperture in the central portion of the rim and a continuing angularly related laterally extending portion, of a valve stem lock to preclude movement of said valve stem through said rim aperture into said tire upon deflation of the tire, said lock including a body, a securing clamp spaced from one end of said body engaging the laterally extending portion of said stem, said clamp defining a a depression in said body and a conforming clamp element between which said laterally extending portion of the stem is received and secured, said body extending from its engagement with the laterally extending portion of the stem inwardly toward the radially extending portion of the stem in a plane generally parallel to the inner face of the rim at the aperture thereof, the inner terminal end of said body being bifurcated and extending past said radially extending portion of the stem, with the furcations thereof laterally straddling said radially extending portion, said body being so secured to the laterally extending portion of the stem as to move with the stem to engage the inner face of the rim adjacent said radially extending portion of the stem upon tendency toward inward movement of the stem upon deflation of the tire.

References Cited in the file of this patent

UNITED STATES PATENTS

| 982,169 | Adams | Jan. 17, 1911 |
| 1,248,528 | Nagel | Dec. 4, 1917 |
| 2,334,801 | Zimmerman | Nov. 23, 1943 |
| 2,580,343 | Benoit | Dec. 25, 1951 |
| 2,652,858 | Snyder | Sept. 22, 1953 |

FOREIGN PATENTS

| 233,724 | Great Britain | Sept. 24, 1925 |
| 582,973 | Great Britain | Dec. 3, 1946 |
| 623,785 | Germany | Jan. 4, 1936 |

OTHER REFERENCES

"Transportation Supply News," May 1955, published by Transportation Supply Publishing Corp., State-Madison Bldg., 22 W. Madison St., Chicago 2, Ill.; page 11; advertisement of Carlan Instruments Co., Inc., in upper right hand corner of page; cited as "Carlan."